US012017838B2

(12) United States Patent
Tatu et al.

(10) Patent No.: US 12,017,838 B2
(45) Date of Patent: Jun. 25, 2024

(54) CONTAINER

(71) Applicant: Colgate-Palmolive Company, New York, NY (US)

(72) Inventors: Francis Tatu, Sea Girt, NJ (US); Daniel Peters, Portland, ME (US); Mark Bartlett, North East, PA (US)

(73) Assignee: Colgate-Palmolive Company, New York, NY (US)

(*) Notice: Subject to any disclaimer, the term of this patent is extended or adjusted under 35 U.S.C. 154(b) by 134 days.

(21) Appl. No.: 17/761,250

(22) PCT Filed: Oct. 14, 2020

(86) PCT No.: PCT/US2020/055453
§ 371 (c)(1),
(2) Date: Mar. 17, 2022

(87) PCT Pub. No.: WO2021/086602
PCT Pub. Date: May 6, 2021

(65) Prior Publication Data

US 2022/0371814 A1 Nov. 24, 2022

Related U.S. Application Data

(60) Provisional application No. 62/928,642, filed on Oct. 31, 2019.

(51) Int. Cl.

| | |
|---|---|
| ***B65D 83/28*** | (2006.01) |
| ***B05B 11/10*** | (2023.01) |
| ***B65D 83/46*** | (2006.01) |

(52) U.S. Cl.
CPC .......... *B65D 83/28* (2013.01); *B05B 11/1015* (2023.01); *B05B 11/1032* (2023.01); *B65D 83/46* (2013.01)

(58) Field of Classification Search
CPC ...... B65D 83/28; B65D 83/46; B65D 83/207; B65D 83/34; B65D 83/345; B05B 11/1015; B05B 11/1032
See application file for complete search history.

(56) References Cited

U.S. PATENT DOCUMENTS 2,731,298 A * 1/1956 Green .................... B65D 83/46 141/20
2,894,660 A * 7/1959 Gordon ................ B65D 83/205 222/108

(Continued)

FOREIGN PATENT DOCUMENTS

EP 1524206 3/2009
JP H082151 Y2 * 1/1996

(Continued)

OTHER PUBLICATIONS

International Search Report and the Written Opinion of the International Searching Authority issued in International Application PCT/US2020/055453 mailed Feb. 2, 2021.

*Primary Examiner* — Vishal Pancholi

(57) ABSTRACT

A container having a pressurized chamber containing a fluidic material and a dispensing assembly coupled thereto. The dispensing assembly includes a dispensing passageway for discharging the fluidic material from the container. A dispensing valve, a tilt valve, and a pump assembly are all operably coupled to the dispensing passageway. The tilt valve is alterable between a closed state in which the pressurized chamber is scaled and an open state in which the dispensing passageway is fluidly coupled to the pressurized chamber. The pump assembly is alterable between a first state in which a variable volume of the dispensing passageway in at a first volume and a second state in which the variable volume is at a second volume that is less than the first volume. Thus, the pump assembly creates a negative (Continued)

pressure behind the dispensing valve to prevent excess fluidic material from being dispensed.

12 Claims, 4 Drawing Sheets

(56) References Cited

U.S. PATENT DOCUMENTS 3,722,760 A 3/1973 Hug
3,759,427 A * 9/1973 Stanley .................. B65D 83/46 D9/449
3,785,528 A * 1/1974 Mandeltort ............ B65D 83/34 222/402.13
4,824,075 A 4/1989 Holzboog
4,895,721 A * 1/1990 Drucker ................. A61Q 11/00 424/53
4,978,035 A * 12/1990 Morane ............... B05B 11/1097 D9/683
5,732,855 A * 3/1998 van der Heijden .. B65D 83/205 222/571
6,264,067 B1 7/2001 Lasserre
7,104,424 B2 * 9/2006 Kolanus ............... B65D 83/205 177/245
8,006,868 B2 * 8/2011 Geiberger .............. B65D 83/20 222/571
9,550,621 B2 1/2017 Smits
9,790,019 B2 10/2017 Brouwer et al.
9,951,759 B2 4/2018 Van Swieten et al.
10,022,740 B2 7/2018 Van Swieten et al.
2008/0093380 A1 * 4/2008 Geiberger .............. B65D 83/20 222/571
2009/0045223 A1 * 2/2009 Laidler ................ B65D 83/206 222/207
2009/0050650 A1 * 2/2009 Walters ................ B65D 83/205 222/402.11

FOREIGN PATENT DOCUMENTS

JP 2005-254142 9/2005
JP 2023014754 A * 1/2023
JP 2023014760 A * 1/2023
WO 2001/025116 4/2001
WO 2005/082743 9/2005
WO 2021/086602 5/2021

* cited by examiner

CONTAINER

BACKGROUND

Toothbrushing is an activity that most people undertake at least twice daily. Typically, a user dispenses a dentifrice from a tube and applies the dispensed dentifrice onto bristles of a toothbrush. The user then brushes the teeth and other oral cavity surfaces with the bristles and dentifrice. During the dispensing of the dentifrice from the tube, excess dentifrice is often dispensed and such excess dentifrice becomes a sticky mess along the dispensing end and exterior of the dentifrice tube. A user may periodically clean the excess dentifrice from the dispensing end of the dentifrice tube, or may simply leave it in place subjecting the user to potentially touching the excess dentifrice with his/her hands, which can make them sticky as well. Thus, a need exists for a container that can dispense fluidic materials such as dentifrice without dispensing an excess amount beyond what is dispensed onto the toothbrush.

BRIEF SUMMARY

The present invention is directed to a container having a pressurized chamber containing a fluidic material and a dispensing assembly coupled thereto. The dispensing assembly includes a dispensing passageway for discharging the fluidic material from the container. A dispensing valve, a tilt valve, and a pump assembly are all operably coupled to the dispensing passageway. The tilt valve is alterable between a closed state in which the pressurized chamber is sealed and an open state in which the dispensing passageway is fluidly coupled to the pressurized chamber. The pump assembly is alterable between a first state in which a variable volume of the dispensing passageway in at a first volume and a second state in which the variable volume is at a second volume that is less than the first volume. Thus, the pump assembly creates a negative pressure behind the dispensing valve to prevent excess fluidic material from being dispensed.

In one aspect, the invention may be a container comprising: a pressurized chamber containing a fluidic material; a dispensing assembly coupled to the pressurized chamber, the dispensing assembly comprising: a dispensing passageway for discharging the fluidic material from the container, the dispensing passageway having a variable volume; a dispensing valve operably coupled to the dispensing passageway; a tilt valve operably coupled to the dispensing passageway and alterable between a closed state in which the tilt valve seals the pressurized chamber and an open state in which the dispensing passageway is in fluid communication with the pressurized chamber; and a pump assembly operably coupled to the dispensing passageway between the dispensing valve and the tilt valve, the pump assembly alterable between a first state in which the variable volume is at a first volume and a second state in which the variable volume is at a second volume that is less than the first volume.

In another aspect, the invention may be a container comprising: a pressurized chamber containing a fluidic material; a dispensing assembly coupled to the pressurized chamber, the dispensing assembly comprising: a dispensing passageway having a dispensing orifice for discharging the fluidic material from the container; a tilt valve operably coupled to the dispensing passageway and alterable between a closed state in which the tilt valve seals the pressurized chamber and an open state in which the dispensing passageway is in fluid communication with the pressurized chamber; and a dispensing valve operably coupled to the dispensing passageway between the dispensing orifice and the tilt valve, the dispensing valve alterable between a dispensing state in which the fluidic material flows through the dispensing valve and a flow control state in which the valve pinches off a stream of fluidic material being dispensed from the container, the dispensing valve self-biased into the fluid-control state.

In yet another aspect, the invention may be a container comprising: a pressurized chamber containing a fluidic material; a dispensing assembly coupled to the pressurized chamber, the dispensing assembly comprising: a dispensing passageway having a dispensing orifice for discharging the fluidic material from the container, the dispensing passageway having a variable volume; a chamber valve operably coupled to the dispensing passageway and alterable between a closed state in which the chamber valve seals the pressurized chamber and an open state in which the dispensing passageway is in fluid communication with the pressurized chamber; and a pump assembly operably coupled to the dispensing passageway between the dispensing orifice and the chamber valve, the pump assembly alterable between a first state in which the variable volume is at a first volume and a second state in which the variable volume is at a second volume that is less than the first volume.

In a further aspect, the invention may be a method of dispensing a fluidic material from a pressurized chamber of a container, the method comprising: a) opening a chamber valve so that the fluidic material within the pressurized chamber flows through a dispensing passageway and exits the container via dispensing orifice of the dispensing passageway; b) closing the chamber valve to seal the pressurized chamber and stop flow of the fluidic material out of the pressurized chamber and into the dispensing orifice; and c) generating a negative pressure in the dispensing passageway.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1A:
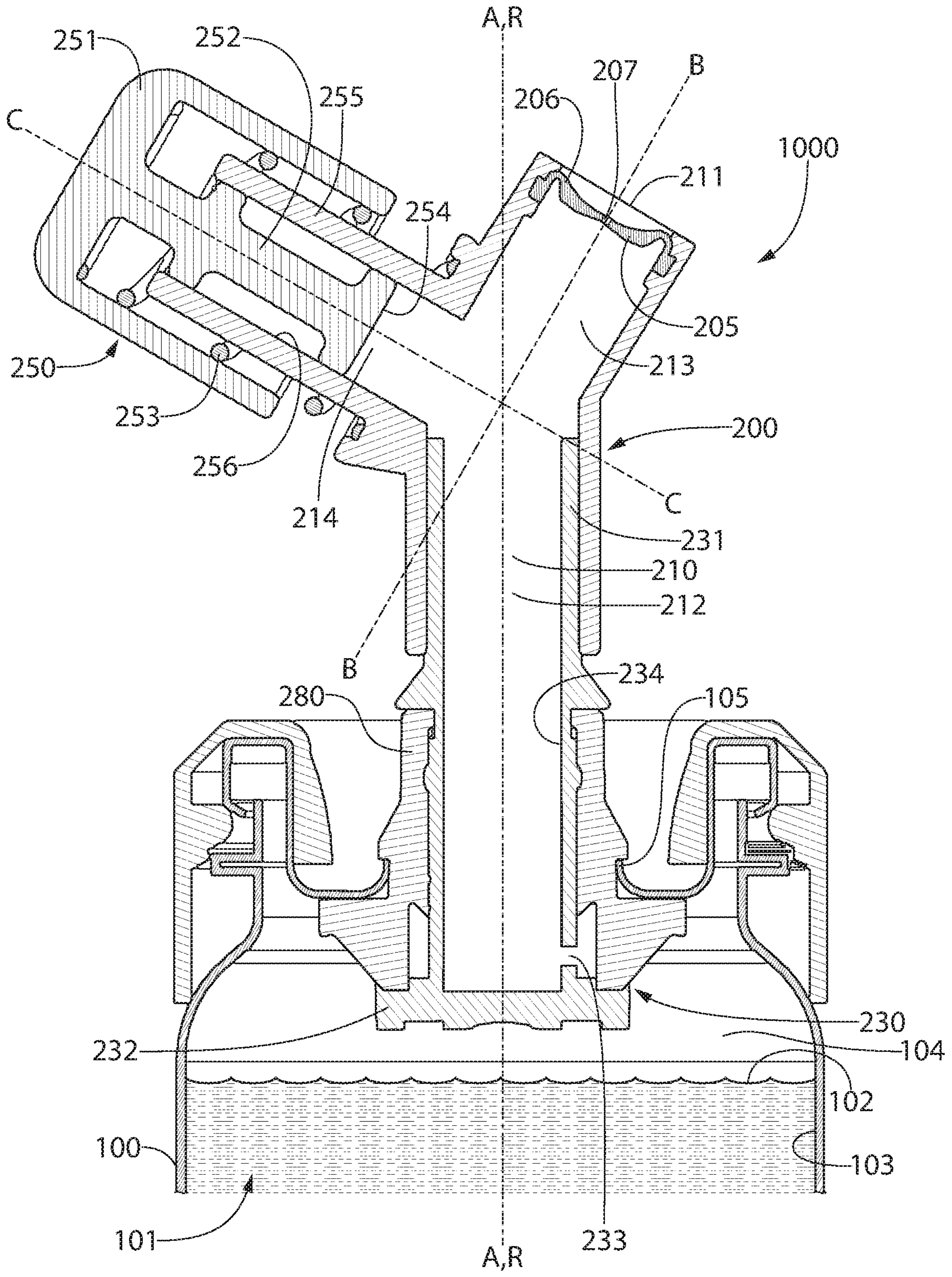
FIG. 1A is a schematic cross-sectional view of a container in accordance with a first embodiment of the present invention, wherein the container includes a chamber valve that is in a closed state.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a container 1000 is illustrated schematically in accordance with an embodiment of the present invention. The container 1000 comprises a body 100 that comprises or defines a pressurized chamber 101 containing a fluidic material 102. Specifically, the body 100 has an inner surface 103 that defines the pressurized chamber 101. The body 100 is only partially shown in FIG. 1, but it should be appreciated that it forms a cylindrical structure having a fully enclosed bottom end as with conventional bottles and containers of this sort. The body 100 also has an opening 105 in its top end so that a dispensing assembly 200 can be operably coupled to the pressurized chamber 101 through the opening 105. In addition to the fluidic material 102, there may also be a gas 104 located inside of the pressurized chamber 101. The gas 104 may be, for example without limitation, pressurized air so that upon an opening being created from the pressurized chamber 101 to a dispensing passageway, the fluidic material 102 is automatically dispensed from the pressurized chamber 101 to the dispensing passageway. Thus, no squeezing or pumping action is required to dispense the fluidic material 102 because it is located in the pressurized chamber 101.

The body 100 may be formed from any material conventionally used to form such components. For example, the body 100 may be formed from plastic, such as high or low density polyethylene, polyethylene terephthalate, polycarbonate, polypropylene, polystyrene, polyvinyl chloride, post-consumer resin, bioplastic, or the like. The body 100 may be rigid so that it cannot be squeezed/compressed or it may be flexible (due to the thickness of its walls) so that it can be squeezed/compressed.

Although the exemplified embodiment is described whereby the pressurized chamber 101 is pressurized with the gas 104, the invention is not to be so limited in all embodiments. The pressurized chamber 101 could be pressurized with an air/gas pressure, a piston that is biased, a pressurized bladder, or the like to name a few. Thus, there are many different ways to create the pressurized chamber 101 and the invention described herein is not intended to be limited to any one such way unless specifically claimed as such.

In the exemplified embodiment, the fluidic material 102 contained in the pressurized chamber 101 may be an oral care material. More specifically, the fluidic material 102 may be a toothpaste or a dentifrice. In some embodiments, where the fluidic material 102 is a toothpaste, the toothpaste may have a viscosity in a range of 70,000 to 400,000 centipoise. Of course, materials other than toothpaste/dentifrice could be stored in and dispensed from the pressurized chamber 101 in other embodiments. Any material that is desired to be dispensed from a container without creating an excess dispense situation may be contained in the pressurized chamber 101 in various other embodiments, including condiments such as ketchup, mustard, and mayonnaise, oral care materials other than toothpaste such as tooth whitening materials, tooth anti-sensitivity compositions, or the like, personal care materials such as shampoo, conditioner, body soap, acne treatment compositions, or the like. Thus, the invention is not to be particularly limited by the material contained in the pressurized chamber 101 unless specifically claimed as such.

As mentioned above, the container 1000 also comprises the dispensing assembly 200, which is coupled to the pressurized chamber 101. Specifically, portions of the dispensing assembly 200 extend through the opening 105 in the body 100 of the container 1000 to fluidly couple the dispensing assembly 200 to the pressurized chamber 101. The dispensing assembly 200 generally comprises a dispensing passageway 210, a dispensing valve 205, a chamber valve 230, and a pump assembly 250. The dispensing assembly 200 may also comprise a resilient grommet 280 in some embodiments.

Figure 2:
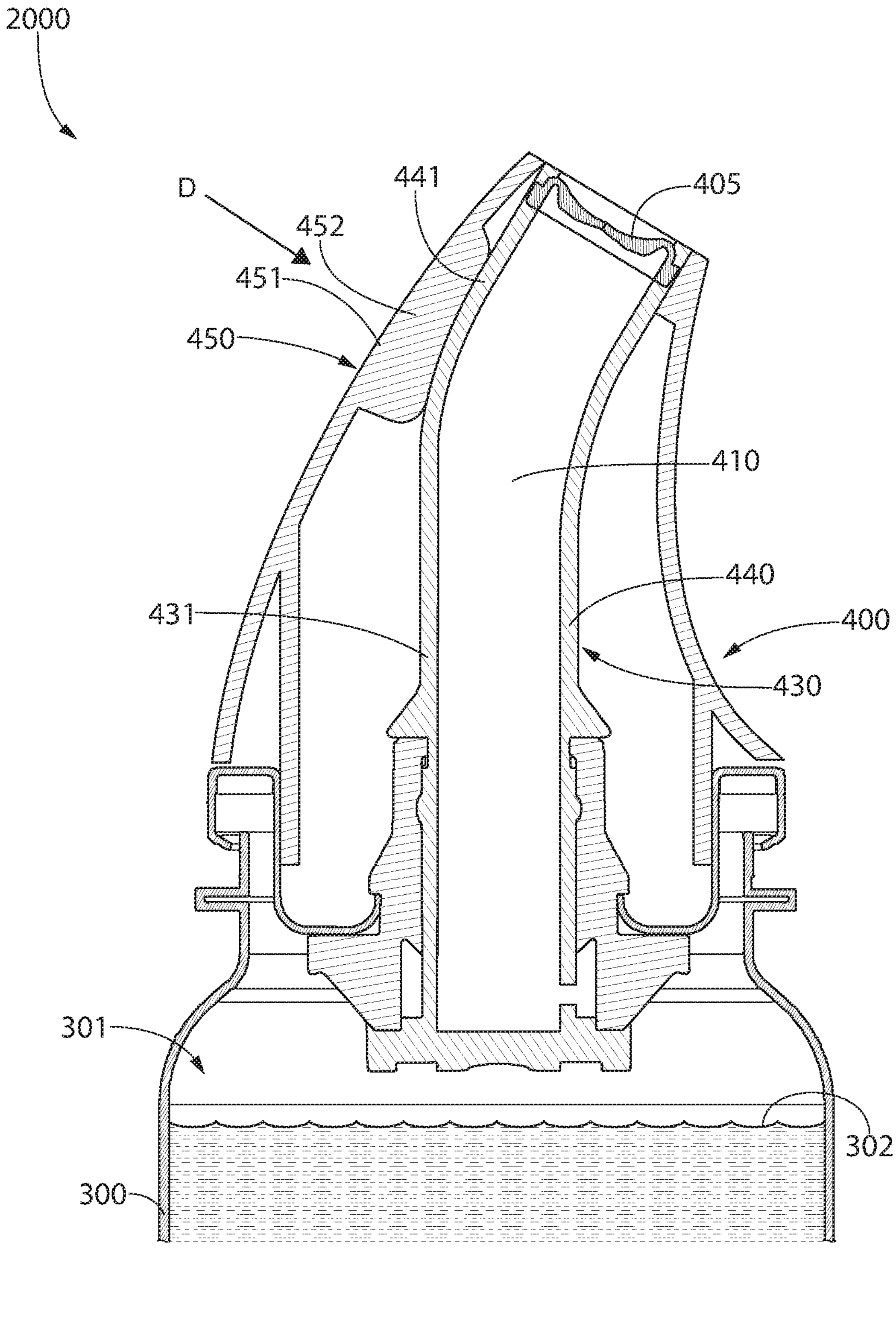
FIG. 2 is a schematic cross-sectional view of a container in accordance with a second embodiment of the present invention.
Figure 3:
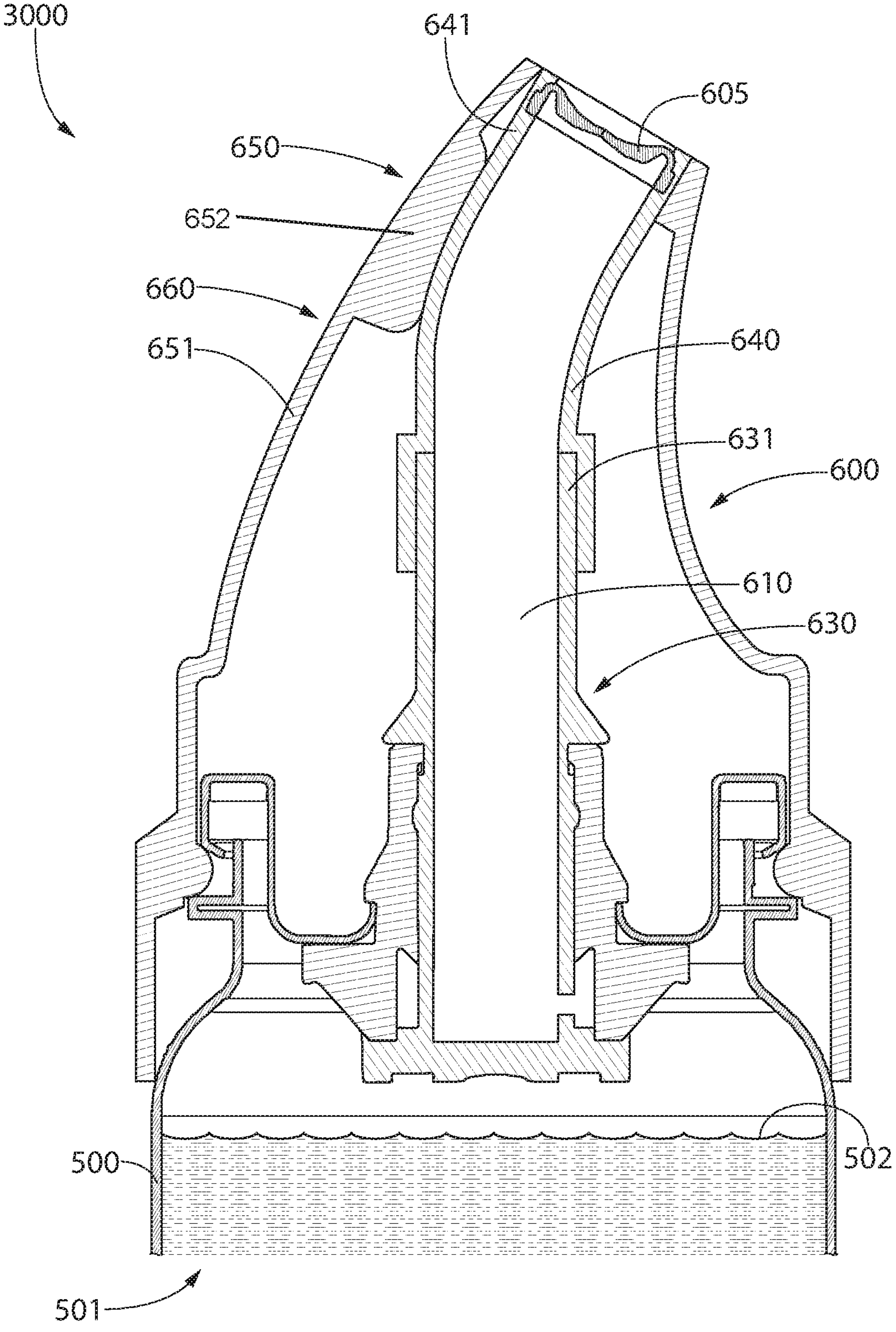
FIG. 3 is a schematic cross-sectional view of a container in accordance with a third embodiment of the present invention.

The dispensing passageway 210 extends from the pressurized chamber 101 to a dispensing orifice 211 of the dispensing passageway 210 so that the fluidic material 102 can be discharged from the container. In the exemplified embodiment, the dispensing passageway 210 comprises a first section 212 that extends along a first axis A-A and a second section 213 that extends along a second axis B-B. In the exemplified embodiment, the second axis B-B is oblique to the first axis A-A. However, the invention is not to be limited by this structural arrangement of the dispensing passageway 210 in all embodiments. In some embodiments, the dispensing passageway 210 may comprise only the first section 212 and not the second section 213. Thus, the entire dispensing passageway 210 may extend along the first axis A-A in some embodiments. Various different shapes are also possible for the dispensing passageway 210 in different embodiments, some examples of which are depicted in FIGS. 2 and 3 described below.

The dispensing valve 205 is located adjacent to and, in the exemplified embodiment, immediately upstream of the dispensing orifice 211 of the dispensing passageway 210. Thus, the fluidic material 102 must pass through the dispensing valve 205 prior to being dispensed from the container 1000 through the dispensing orifice 211. The dispensing valve 205 may be any valve that can permit the fluidic material 102 to be dispensed therethrough when the chamber valve 230 is opened. In the exemplified embodiment, the dispensing valve 205 may be a one-way valve, although this is not required in all embodiments and the dispensing valve 205 may be a two-way valve in other embodiments.

In the exemplified embodiment, the dispensing valve 205 comprises a resilient wall 206 having one or more slits or openings 207 therein. Of course, the dispensing valve 205 can take on other structural forms in other embodiments.

Moreover, in some embodiments it may be possible to omit the dispensing valve 205 while still achieving a negative pressure to prevent excess dispensing as described herein below.

The dispensing valve 205 comprises a dispensing state (see, for example, FIG. 1B) in which the fluidic material 102 flows through the dispensing valve 205 for dispensing from the container 1000. The dispensing valve 205 also comprises a flow control state (see, for example, FIG. 1A) in which the dispensing valve 205 pinches off a stream of the fluidic material 102 being dispensed from the container 1000 to prevent an excess amount from being dispensed. The dispensing valve 205 may be self-biased into the flow control state such that it is only in the dispensing state when the chamber valve 230 is opened and the fluidic material 102 is being dispensed. Stated another way, in the exemplified embodiment, the resilient wall 206 of the dispensing valve 205 is self-biased into the flow control state (FIG. 1) and assumes the dispensing state (FIG. 1B) upon positive pressurization of the fluidic material 102 in the dispensing passageway 210. Further details of this function and operation of the dispensing valve 205 will be described below.

The chamber valve 230 is operably coupled to the dispensing passageway 210 and at least partially defines the dispensing passageway 210 in the exemplified embodiment. Specifically, the chamber valve 230 comprises a valve stem 231, a sealing member 232, and one or more apertures 233. In the exemplified embodiment, the one or more apertures 233 are located in the valve stem. An inner surface 234 of the valve stem 231 defines at least a part of the first portion 212 of the dispensing passageway 210. When the chamber valve 230 is opened (FIG. 1B), the fluidic material 102 is made to flow into the dispensing passageway 210 through the one or more apertures 233 in the chamber valve 230.

In the exemplified embodiment, the chamber valve 230 is a tilt valve, which is a valve that operates by tilting the valve structure relative to the body 100 to create an opening that leads from the pressurized chamber 101 into the dispensing passageway 210. Such a tilt valve, when not being tilted relative to the body 100, closes the pressurized chamber 101. Thus, the chamber valve 230 is operably coupled to the dispensing passageway 210 and alterable between a closed state (FIG. 1A) in which the chamber valve 230 seals the pressurized chamber 101 and an open state (FIG. 1B) in which the dispensing passageway 210 is in fluid communication with the pressurized chamber 101 so that the fluidic material 102 can flow from the pressurized chamber 101 into the dispensing passageway 210 for dispensing through the dispensing orifice 211.

Figure 1B:
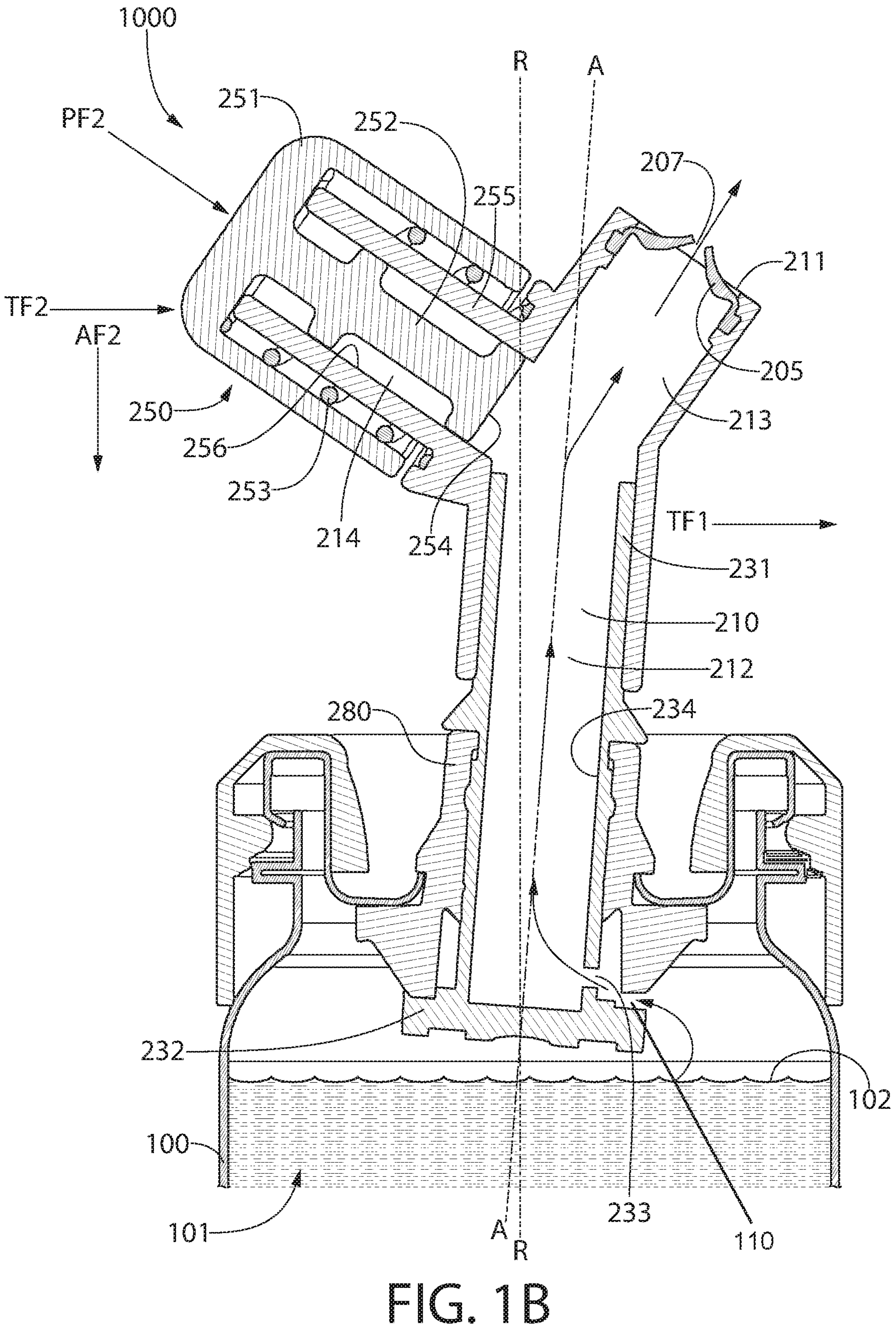
FIG. 1B is a schematic cross-sectional view of the container of FIG. 1A, wherein the chamber valve is in an open state.

When the chamber valve 230 is in the closed state as shown in FIG. 1A, there is no opening for the fluidic material 102 to pass through to enter into the dispensing passageway 210. Thus, when the chamber valve 230 is in the closed state, the fluidic material 102 is not dispensed despite the fact that the fluidic material 102 is held in the pressurized chamber 101. It is only when an opening is created by altering the chamber valve 230 into the open state as shown in FIG. 1B that the fluidic material 101 can be dispensed from the container 1000. The chamber valve 230 is biased into the closed state of FIGS. 1A and 1*s* only moved into the open state of FIG. 1B when forced there by a user or other interaction.

In the exemplified embodiment, the pump assembly 250 is operably coupled to the dispensing passageway 210. Specifically, the pump assembly 250 is located along the dispensing passageway 210 between the dispensing valve 205 and the chamber valve (or tilt valve) 230. The purpose of the pump assembly 250 is to create a negative pressure (or back pressure) in the dispensing passageway 210 after dispensing of the fluidic material 102 is stopped, which thereby pulls excess fluidic material 102 back into the dispensing passageway 210 rather than allowing it to pass through the dispensing orifice 211. As used herein, the term “negative pressure” and “back pressure” may refer to a negative volumetric being created in the dispensing passageway 210. The pump assembly 250 is also the mechanism by which a user can actuate the chamber valve 230 from the closed state to the open state, although the user could alter the chamber valve 230 in this manner via direct contact with the chamber valve 230 rather than using the pump assembly 250.

The pump assembly 250 generally comprises an actuator 251, a pressurization element 252 that is driven by the actuator 251, a resilient element 253 that biases the actuator 251 into the position shown in FIG. 1A, and a barrel wall 255. The pump assembly 250 is alterable between a first state, shown in FIG. 1A, and a second state, shown in FIG. 1B (specifically, the actuator 251 of the pump assembly 250 is alterable from the first state to the second state). Altering the pump assembly 250 between the first and second states is achieved by movement of the actuator 251 (and simultaneously the pressurization element 252) as will be described in more detail below. The resilient element 253 of the pump assembly 250 biases the actuator 251 (and hence also the pump assembly 250) into the first state. Thus, a user must press the actuator 251 with sufficient force to overcome the biasing force of the resilient element 253 in order to alter the pump assembly 250 into the second state. In the exemplified embodiment, the resilient element 253 is a spring. However, the resilient element 253 can take on other structural forms in other embodiments, such as being a rubber-like material with compression capabilities, memory foam, weights and a lever, washers, or the like.

In the exemplified embodiment, the actuator 251 and the pressurization element 252 are formed as a monolithic singular component. More specifically, in the exemplified embodiment the actuator 251 and the pressurization element 252 are formed of a resilient material and they form a monolithic component. In other embodiments, the actuator 251 and the pressurization element 252 could be separate components that are coupled together or that otherwise interact during operation to achieve the function described herein. In the exemplified embodiment, the pressurization element 252 is a plunger or a piston. In other embodiments, the pressurization element 252 could be a diaphragm. The pressurization element 252 comprises an end surface 254 that forms a movable wall of the dispensing passageway 210, as described further below.

The actuator 251 is operably coupled to the barrel wall 255 by the resilient element 253. The barrel wall 255 comprises an inner surface 256 that defines a third portion 214 of the dispensing passageway 210, which extends along an axis C-C that is oblique to the first axis A-A. The axis C-C may be oblique or perpendicular relative to the second axis B-B. The pressurization element 252 is positioned within and moves within the third portion 214 of the dispensing passageway 210 along the axis C-C. Portions of the pressurization element 252 are in constant contact with and sealed against the inner surface 256 of the barrel wall 255 so that no fluids (gas or liquid) can pass beyond the end surface 254 of the pressurization element 252.

The dispensing passageway 210 has a variable volume, which is dictated by the state of the pump assembly 250. Specifically, referring to FIGS. 1A and 1B, when the actuator 251 of the pump assembly 250 is in the first state (FIG. 1A), the dispensing passageway 210 has a first volume and when the actuator 251 of the pump assembly 250 is in the second state (FIG. 1B), the dispensing passageway 210 has a second volume that is less than the first volume. Thus, actuating the actuator 251 from the first state to the second state decreases the volume of the dispensing passageway 210. This is because the pressurization element 252 moves within the third portion 214 of the dispensing passageway 210 in a first direction that reduces the volume of the dispensing passageway 210 during actuation of the actuator 251. Upon release of the actuator 251, the actuator 251 will alter from the second state back to the first state, thereby increasing the volume of the dispensing passageway 210 and creating a negative pressure in the dispensing passageway 210 as described further below. The pump assembly 250 and the actuator 251 thereof are biased into the first state by the resilient member 253.

Still referring to FIGS. 1A and 1B, the operation and function of the container 1000 will be described along with some additional features/structures thereof. In FIG. 1A, the chamber valve 230 is in the closed state, and the chamber valve 230 is biased into this state meaning that the closed state is the natural state of the chamber valve 230 when no pressure or forces are acting upon it. In the closed state, the chamber valve 230 seals the pressurized chamber 101 such that the fluidic material 102 cannot flow into the dispensing passageway 210. This is due to an abutment between the grommet 280 and the sealing member 232 of the chamber valve 230 in the exemplified embodiment, although there are other ways of achieving this closed state in other embodiments. When the chamber valve 230 is in the closed state, the first axis A-A of the first portion 212 of the dispensing passageway 210 is coincident with a reference axis R-R.

In FIG. 1B, the chamber valve 230 is in the open state. The chamber valve 230 must be altered from its natural state (i.e., the closed state) into the open state. This can be achieved by applying a pressure or force onto the chamber valve 230 as described in more detail below. When such force is applied onto the chamber valve 230, the sealing member 232 is pushed away from the grommet 280 on one side, and the fluidic material 102 in the pressurized chamber 101 is free to pass into a pathway 110 between the sealing member 232 and the grommet 280, through the one or more apertures 233 in the chamber valve 230, along the dispensing passageway 210 and through the dispensing orifice 211. Thus, due to the pressurization of the pressurized chamber 210, as soon as the pathway 110 is created the fluidic material 102 will begin flowing through the pathway 110 and into the dispensing passageway 210 where it can be dispensed from the container 1000 through the dispensing orifice 211. Specifically, because the fluidic material 102 is pressurized, upon the pathway 110 being opened the fluidic material 102 will flow through the pathway 110, through the dispensing passageway 210, and then through the slits or openings 207 in the dispensing valve 205. Upon release of the force being applied onto the chamber valve 230, the resilience of the grommet 280 may push the chamber valve 230 back into the position shown in FIG. 1A.

As seen in FIG. 1B, the pressure of the fluidic material 102 flowing through the dispensing passageway 210 causes the dispensing valve 205 to alter into the dispensing state. In the dispensing state, the fluidic material 102 is permitted to flow through the dispensing valve 205 and out of the container 1000 via the dispensing orifice 211.

In the exemplified embodiment, when the chamber valve 230 is in the open state, the chamber valve 230 is tilted relative to its natural, biased position. Thus, when the chamber valve 230 is in the open state, the chamber valve 230 is moved into a tilted orientation in which the first axis A-A of the first portion 212 of the dispensing passageway 210 is oblique to the reference axis R-R. Thus, the reference axis R-R does not move, but comparing FIGS. 1A and 1B shows that the first axis A-A does move as the chamber valve 230 is altered from the closed state to the open state. In some embodiments, altering the chamber valve 230 from the closed state to the open state may comprise tilting the chamber valve 230 between 2° and 7° relative to the reference axis R-R.

In certain embodiments, a user will use the pump assembly 250 to alter the chamber valve 230 from the closed state to the open state. In that regard, it may be desirable in some embodiments for the biasing force of the resilient element 253 of the pump assembly 250 (i.e., the force required to alter the pump assembly from the first state to the second state) to be less than a biasing force of the chamber valve 230 (i.e., a force required to alter the chamber valve 230 from the closed state to the open state). As a result, if a user actuates the actuator 251 of the pump assembly 250, first the actuator 251 of the pump assembly 250 will be altered from the first state (FIG. 1A) to the second state (FIG. 1B), and only after the actuator 251 has been altered into the second state will the chamber valve 230 be altered from the closed state (FIG. 1A) to the open state (FIG. 1B). Thus, in the exemplified embodiment the actuator 251: (1) initially actuates the pump assembly 250 from the first state to the second state when subjected to an actuation force; and (2) subsequently actuates the chamber valve 230 from the closed state to the open state when subjected to continued application of the actuation force. In some embodiments, the actuator 251 is therefore operably coupled to actuate both the pump assembly 250 and the chamber valve 230.

In the exemplified embodiment, a first transverse force component TF1 is required to move the chamber valve 230 from the closed state to the open state. The first transverse force component TF1 is transverse to the reference axis R-R in the exemplified embodiment. Moreover, a pump actuation force PF2 is required to alter the pump assembly 250 from the first state to the second state. The pump actuation force PF2 has a second transverse force component TF2 that is transverse to the reference axis R-R and a second axial force component AF2 that extends in the same direction as the reference axis R-R. The second transverse force component TF2 associated with the pump actuation force PF2, which is the force required to alter the pump assembly 250 from the first state to the second state, is less than the first transverse force TF1 that is required to move the chamber valve 230 from the closed state to the open state. This ensures that the pump assembly 250 is altered from the first state to the second state before the chamber valve 230 is altered from the closed state to the open state. Thus, when the chamber valve 230 is eventually altered into the open state, the pump assembly 250 will be in the second state such that the dispensing passageway 210 is at a reduced volume relative to its maximum volume.

The actuator 251 travels on an actuator path when altering the pump assembly 250 from the first state to the second state. In the exemplified embodiment, the actuator path is oblique to the reference axis R-R. However, the invention is not to be so limited. In other embodiments, the actuator path may be arcuate (see, for example, the embodiments of FIGS. 2 and 3 described below). In still other embodiments, the actuator path may be transverse to the reference axis R-R.

Thus, as stated above, a user actuating the actuator 251 of the pump assembly 250 will first cause the pump assembly 250 to alter from the first state to the second state. After the pump assembly 250 is in the second state, continued force applied to the actuator 251 of the pump assembly 250 will alter the chamber valve 230 from the closed state to the open state. This is important in some embodiments because it ensures the creation of a negative or back pressure in the dispensing passageway 210 after completion of dispensing, as discussed below. Of course, a user could potentially avoid use of the pump assembly 250 altogether by applying the first transverse force component TF1 directly onto the chamber valve 230 rather than doing so indirectly via the pump assembly 250. However, this type of usage will not generate a negative pressure as discussed herein and will not benefit from the same.

As discussed above, when the pump assembly 250 is altered from the first state to the second state, the volume of the dispensing passageway 210 decreases. This is because the pressurization element 252 moves along with the actuator 251 to reduce the volume of the dispensing passageway 210. As the end surface 254 of the pressurization element 252 forms a wall of the dispensing passageway 210, the location of the end surface 254 dictates the volume of the dispensing passageway 210. As discussed above, the end surface 254 of the pressurization element 252 is tightly sealed against the inner surface 256 of the barrel wall 255 so that the end surface 254 forms a distinct end of the dispensing passageway 210.

After dispensing is finished, a user will release the actuator 251. This will result in the chamber valve 230 altering from the open state (FIG. 1B) back to the closed state (FIG. 1A). Furthermore, this will result in the pump assembly 250 altering from the second state (FIG. 1B) back to the first state (FIG. 1A). As the pump assembly 250 alters from the second state to the first state, the pressurization element 252 moves along the third axis C-C, which increases the volume of the dispensing passageway 210. Because the chamber valve 230 is closed during at least some of the movement of the pressurization element 252, the movement of the pressurization element 252 creates a negative or back pressure in the dispensing passageway 210. Thus, the pump assembly 250 moving from the second state to the first state increases the volume in the dispensing passageway 210 and creates a back pressure in the dispensing passageway 210 behind the dispensing valve 205, which causes the dispensing valve 205 to be altered from the dispensing state (FIG. 1B) to the flow control state (FIG. 1A). As the dispensing valve 205 is altered from the dispensing state to the flow control state, the dispensing valve 205 pinches off a stream of the fluidic material 102 that was being dispensed from the container 1000 and ensures that no excess amounts of the fluidic material 102 will be dispensed or remain along the exterior of the container 1000. In the exemplified embodiment, the dispensing valve 205 is self-biased into the flow control state.

Although not shown in the exemplified embodiment, in some embodiments there may be a dip tube located in the pressurized chamber 101 to facilitate the dispensing of the fluidic material 102. Specifically, during dispensing the gas 104 may push the fluidic material 102 downwardly towards a bottom of the body 100 rather than directly up through the pathway 110. Thus, in order to facilitate proper dispensing, the dip tube may be provided so that as the gas 104 presses the fluidic material 102 downward, the fluidic material 102 can flow up along the dip tube to the pathway 110 and into the one or more apertures 233 for dispensing. Of course, whether or not a dip tube is needed will be dictated by the manner in which the pressurized chamber 101 is pressurized and the structure and arrangement of the remaining components of the container 1000.

Referring to FIG. 2, another embodiment of a container 2000 is illustrated in accordance with an embodiment of the present invention. Similar to the container 1000, the container 2000 comprises a body 300 comprising a pressurized chamber 301 containing a fluidic material 302 and a dispensing assembly 400 coupled to the pressurized chamber 301. The dispensing assembly 400 comprises a dispensing passageway 410, a dispensing valve 405, a chamber valve (or tilt valve in some embodiments) 430, and a pump assembly 450. The container 2000 is very similar to the container 1000 in both its structure and operation and thus only the differences between the two will be described herein, it being understood that the description of the container 1000 is otherwise applicable. The container 2000 is generally designed and configured to generate a back pressure upon completion of a dispensing action much as described above to prevent excessive amounts of the fluidic material 302 from being dispensed.

The main difference between the container 2000 and the container 1000 is in the structure of the pump assembly 450 and how the pump assembly 450 interacts with the chamber valve 430. Specifically, in this embodiment the chamber valve 430 comprises valve stem 431 comprising a rigid portion 440 and a resilient or elastomeric portion 441. The resilient or elastomeric portion 441 may be a diaphragm or the like in some embodiments.

The pump assembly 450 comprises an actuator 451 and a pressurization element 452. The pressurization element 452 may be referred to as a piston or a plunger in various embodiments. The pressurization element 452 is a protrusion that extends from the actuator 451 and is aligned with the resilient portion 441 of the valve stem 431. Upon actuation of the actuator 451 (which may move in an arcuate actuator path in this embodiment), the pressurization element 452 will contact and compress/deform the resilient portion 441 of the valve stem 431. The actuator 451 is actuated by exerting a force on the actuator 451 in a direction D. Continued actuation of the actuator 451 in the direction D will then cause the chamber valve 430 to alter from the closed state shown in FIG. 2 to an open state (not shown, but similar to the open state of FIG. 1B). Similar to the previous embodiment, preferably a smaller force is required to compress/deform the resilient portion 441 of the valve stem 431 than is required to move the chamber valve 430 from the closed state shown in FIG. 2 to the open state. In that way, the resilient portion 441 of the valve stem 431 will be compressed before the chamber valve 430 is opened. In some embodiments, the chamber valve 430 will not alter from the closed state into the open state until the actuator 451 of the pump assembly 450 has reached its limit of travel.

When the force on the actuator 451 is released, the chamber valve 430 closes and then the pressurization element 452 pulls away from the resilient portion 441 of the valve stem 431. This operation generates a back pressure (or negative pressure) behind the dispensing valve 405, which forces the dispensing valve 405 to close and pinch off any stream of the fluidic material 302 that was otherwise being dispensed. Thus, the container 2000, and particularly the dispensing assembly 400 thereof, has a different structure than that of the container 1000 but a similar result.

Referring to FIG. 3, another embodiment of a container 3000 is illustrated in accordance with an embodiment of the present invention. Similar to the container 1000, the container 3000 comprises a body 500 comprising a pressurized chamber 501 containing a fluidic material 502 and a dispensing assembly 600 coupled to the pressurized chamber 501. The dispensing assembly 600 comprises a dispensing passageway 610, a dispensing valve 605, a chamber valve (or tilt valve in some embodiments) 630, and a pump assembly 650. The container 3000 is very similar to the containers 1000, 2000 in both its structure and operation and thus only the differences will be described herein, it being understood that the description of the container 1000 and also the container 2000 are otherwise applicable. The container 3000 is generally designed and configured to generate a back pressure upon completion of a dispensing action much as described above to prevent excessive amounts of the fluidic material 302 from being dispensed.

The main difference between the container 3000 and the container 1000 is in the structure of the pump assembly 650 and how the pump assembly 650 interacts with the chamber valve 630. Specifically, in this embodiment the chamber valve 630 comprises valve stem 631 comprising a rigid portion 640 and a resilient or elastomeric portion 641. The resilient or elastomeric portion 641 may be a diaphragm or the like in some embodiments. Furthermore, in this embodiment the dispensing assembly 650 comprises a rigid shell 660 that comprises an actuator 651, a pressurization element 652, and the dispensing valve 605. Thus, in this embodiment the dispensing valve 605 is formed integrally with the components of the pump assembly 650. As with the container 2000, the pressurization element 652 is aligned with the resilient portion 641 of the valve stem 631 to facilitate the generation of a negative pressure in the dispensing passageway 610 as has been described herein.

As noted above, the pump assembly 650 comprises the actuator 651 and the pressurization element 652. The pressurization element 652 may be referred to as a piston or a plunger in various embodiments. The pressurization element 652 is a protrusion that extends from the actuator 651 and is aligned with the resilient portion 641 of the valve stem 631. The pressurization element 652 may be flexible so that it can flex/move relative to the remainder of the rigid shell. Thus, pressure/force acting on the pressurization element 652 may cause the pressurization element 652 to move along an actuation path as has been described herein.

Upon actuation of the actuator 651 (which may move in an arcuate actuator path in this embodiment), the pressurization element 652 will contact and compress/deform the resilient portion 641 of the valve stem 631. Continued actuation of the actuator 651 will then cause the chamber valve 630 to alter from the closed state shown in FIG. 3 to an open state (not shown, but similar to the open state of FIG. 1B). Similar to the previous embodiment, preferably a smaller force is required to compress/deform the resilient portion 641 of the valve stem 631 than is required to move the chamber valve 630 from the closed state shown in FIG. 3 to the open state. In that way, the resilient portion 641 of the valve stem 631 will be compressed before the chamber valve 630 is opened. In some embodiments, the chamber valve 630 will not alter from the closed state into the open state until the actuator 651 of the pump assembly 650 has reached its limit of travel.

When the force on the actuator 651 is released, the chamber valve 630 closes and then the pressurization element 652 pulls away from the resilient portion 641 of the valve stem 631. This operation generates a back pressure (or negative pressure) behind the dispensing valve 605, which forces the dispensing valve 605 to close and pinch off any stream of the fluidic material 302 that was otherwise being dispensed. Thus, the container 3000, and particularly the dispensing assembly 600 thereof, has a different structure than that of the container 1000 but a similar result.

In some aspects, regardless of the particular structural embodiment used, the invention may be directed to a method of dispensing a fluidic material 102, 302, 502 from a pressurized chamber 101, 301, 501 of a container 1000, 2000, 3000. Such a method may comprise opening a chamber valve 230, 430, 630 so that the fluidic material 102, 302, 502 within the pressurized chamber 101, 301, 501 flows through a dispensing passageway 210, 410, 610 and exits the container 1000, 2000, 3000 via dispensing orifice (such as the dispensing orifice 211) of the dispensing passageway 210, 410, 610. Such opening of the chamber valve 230, 430, 630 may comprise applying an actuation force to an actuator 251, 451, 651, thereby causing a pump assembly 250, 450, 650 to reduce a volume of the dispensing passageway 210, 410, 610, and then continuing application of the actuation force on the actuator 251, 451, 651 until the chamber valve 230, 430, 630 opens. Next, after an adequate or desired amount of the fluidic material 102, 302, 502 has been dispensed, the method may include closing the chamber valve 230, 430, 630 to seal the pressurized chamber 101, 301, 501 and stop flow of the fluidic material 102, 302, 502 out of the pressurized chamber 101, 301, 501 and into the dispensing orifice (such as the dispensing orifice 211). Such closing of the chamber valve 230, 430, 630 may include discontinuing or ceasing the actuation force on the actuator 251, 451, 651 so that the chamber valve 230, 430, 630 closes. Finally, the method may include generating a back-pressure in the dispensing passageway 210, 410, 610. The back pressure may be generated by the action of discontinuing the actuation force on the actuator 251, 451, 651, which causes the pump assembly 250, 450, 650 to increase the volume of the dispensing passageway 210, 410, 610.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A container comprising:

a pressurized chamber containing a fluidic material;

a dispensing assembly coupled to the pressurized chamber, the dispensing assembly comprising:

a dispensing passageway for discharging the fluidic material from the container, the dispensing passageway having a variable volume;

a dispensing valve operably coupled to the dispensing passageway;

a tilt valve operably coupled to the dispensing passageway and alterable between a closed state in which the tilt valve seals the pressurized chamber and an open state in which the dispensing passageway is in fluid communication with the pressurized chamber; and a pump assembly operably coupled to the dispensing passageway between the dispensing valve and the tilt valve, the pump assembly alterable between a first state in which the variable volume is at a first volume and a second state in which the variable volume is at a second volume that is less than the first volume, wherein the pump assembly further comprises an actuator and a pressurization element that is driven by the actuator, a surface of the pressurization element forming a wall of the dispensing passageway; and wherein movement or deflection of the pressurization element varies volume of the variable volume of the dispensing passageway between the first and second volumes; and wherein the dispensing valve comprises a resilient wall comprising one or more slits, wherein the resilient wall is self-biased into a flow control state and assumes a dispensing state upon positive pressurization of the fluidic material in the dispensing passageway.

2. The container according to claim 1 wherein the pump assembly is biased into the first state.

3. The container according to claim 1 wherein the tilt valve is biased into the closed state.

4. The container according to claim 1 further comprising:

the dispensing passageway comprising a first section that extends along a first axis; and wherein, in the closed state, the first axis is coincident with a reference axis and, in the open state, the first section of the dispensing passageway is moved into a tilted orientation and the first axis extends at an oblique angle relative to the reference axis.

5. The container according to claim 4 wherein a first transverse force component, relative to the reference axis, is required to move the tilt valve from the closed state to the open state, wherein a pump actuation force is required to alter the pump assembly from the first state to the second state, the pump actuation force having a second transverse force component, relative to the reference axis; and wherein the second transverse force component is less than the first transverse force component, wherein the pump actuation force further comprises an axial force component, relative to the reference axis.

6. The container according to claim 4 wherein the actuator alters the pump assembly from the first state to the second state, the actuator traveling along an actuator path when altering the pump assembly from the first state to the second state, and the actuator path being arcuate or oblique to the reference axis.

7. The container according to claim 1 wherein the dispensing valve is located adjacent a dispensing orifice of the dispensing passageway.

8. The container according to claim 1 wherein the dispensing valve is a one-way valve.

9. The container according to claim 1 wherein the dispensing valve comprises a dispensing state in which the fluidic material flows through the dispensing valve and a flow control state in which the dispensing valve pinches off a stream of the fluidic material being dispensed from the container, wherein the dispensing valve is altered from the dispensing state to the flow control state due to a back pressure created in the dispensing passageway by the pump assembly moving from the second state to the first state.

10. The container according to claim 1, wherein the actuator and the pressurization element are formed of a resilient material as a monolithic singular component.

11. The container according to claim 1, wherein the pressurization element is one of a diaphragm and a piston.

12. A container comprising:

a pressurized chamber containing a fluidic material;

a dispensing assembly coupled to the pressurized chamber, the dispensing assembly comprising:

a dispensing passageway for discharging the fluidic material from the container, the dispensing passageway having a variable volume, the dispensing passageway comprising a first section that extends along a first axis;

a dispensing valve operably coupled to the dispensing passageway;

a tilt valve operably coupled to the dispensing passageway and alterable between a closed state in which the tilt valve seals the pressurized chamber and an open state in which the dispensing passageway is in fluid communication with the pressurized chamber; and a pump assembly operably coupled to the dispensing passageway between the dispensing valve and the tilt valve, the pump assembly alterable between a first state in which the variable volume is at a first volume and a second state in which the variable volume is at a second volume that is less than the first volume;

wherein, in the closed state, the first axis is coincident with a reference axis and, in the open state, the first section of the dispensing passageway is moved into a tilted orientation and the first axis extends at an oblique angle relative to the reference axis; and wherein the pump assembly comprises an actuator to alter the pump assembly from the first state to the second state, the actuator traveling along an actuator path when altering the pump assembly from the first state to the second state, and the actuator path being arcuate or oblique to the reference axis.

* * * * *